United States Patent
Chen

(10) Patent No.: US 7,391,837 B2
(45) Date of Patent: Jun. 24, 2008

(54) NEWTON'S METHOD-BASED TIMING RECOVERY CIRCUIT

(75) Inventor: Chien-Sheng Chen, Tai-Chung Hsien (TW)

(73) Assignee: Faraday Technology Corp., Hsin-Chu (TW)

(*) Notice: Subject to any disclaimer, the term of this patent is extended or adjusted under 35 U.S.C. 154(b) by 718 days.

(21) Appl. No.: 10/904,758

(22) Filed: Nov. 26, 2004

(65) Prior Publication Data

US 2006/0115034 A1      Jun. 1, 2006

(51) Int. Cl.
*H04L 7/00*     (2006.01)
*H04L 12/56*    (2006.01)
*H04L 12/28*    (2006.01)

(52) U.S. Cl. .................. 375/355; 370/395.62

(58) Field of Classification Search ............. 375/355, 375/354; 327/141; 370/503; 713/400
See application file for complete search history.

(56) References Cited

U.S. PATENT DOCUMENTS

| 2005/0084048 A1* | 4/2005 | Wu ........................ 375/355 |
| 2005/0111594 A1* | 5/2005 | Varyzgin ................. 375/344 |
| 2005/0147194 A1* | 7/2005 | Koenenkamp ........... 375/348 |

\* cited by examiner

*Primary Examiner*—David C. Payne
*Assistant Examiner*—Brian J Stevens
(74) *Attorney, Agent, or Firm*—Winston Hsu

(57) ABSTRACT

A Newton's method-based timing recovery circuit is provided for to solving a polynomial accurately. The timing recovery circuit can generate an interpolation signal, whose timing errors are confined within a predetermined timing error range, which corresponds to a demodulating capability of a demodulator. Therefore, the demodulator can demodulate the interpolation signal accurately.

27 Claims, 5 Drawing Sheets

| Bit Number | Gate Count |
|---|---|
| 4/2 | 98.0 |
| 6/3 | 203.7 |
| 8/4 | 335.7 |
| 10/5 | 500.0 |
| 12/6 | 1085.7 |
| 14/7 | 1440.0 |
| 16/8 | 1866.7 |
| 18/9 | 2393.3 |
| 20/10 | 3122.7 |

Fig. 4

| Bit Number | Gate Count |
|---|---|
| 2 | 18 |
| 4 | 33 |
| 6 | 48 |
| 8 | 63 |
| 10 | 77 |
| 12 | 92 |
| 14 | 107 |
| 16 | 121 |
| 18 | 136 |
| 20 | 151 |

Fig. 5

NEWTON'S METHOD-BASED TIMING RECOVERY CIRCUIT

BACKGROUND OF INVENTION

1. Field of the Invention

The present invention relates to a timing recovery circuit, and more particularly, to a Newton's method-based timing recovery circuit.

2. Description of the Prior Art

In a wireless communications system, wireless signals received by a receiver have to enter into a synchronization process first and then travel to a demodulator to be demodulated accurately. A timing recovery circuit is designed to execute the synchronization process.

Please refer to FIG. 1, which is a function block diagram of a timing recovery circuit 10 according to the prior art. The timing recovery circuit 10 comprises a sampling clock generator 12, a sampler 14, an interpolator 16, and a data filter 18.

The sampling clock generator 12 generates a sampling clock $T_S$ having a period $T_S$; The sampler 14 samples a wireless signal X(t) according to the sampling clock $T_S$ and generates a sampling signal $X(mT_S)$; The interpolator 16 interpolates the sampling signal $X(mT_S)$ with an interpolation interval $T_i$ and generates an interpolation signal $Y(kT_i)$; The data filter 18 filters away noises in the interpolation signal $Y(kT_i)$ and outputs an interpolation signal $Y_f(kT_i)$ to a demodulator electrically connected to the timing recovery circuit 10 to be demodulated.

In order that the demodulator can demodulate the interpolation signal $Y_f(kT_i)$ output from the data filter 18 accurately, the timing recovery circuit 10 has to further comprise a timing error detector 20, and a timing error controller 22 electrically connected between the timing error detector 20 and the interpolator 16.

The timing error detector 20 detects any timing errors in the interpolation signal $Y_f(kTi)$ and generates a timing error signal e; The timing error controller 22 generates a timing_offset signal μ to control the operation of the interpolator 16 according to the timing error signal e, so as to reduce the timing errors in the interpolation signal $Y_f(kTi)$ ready to be generated by the data filter 18. Therefore, the demodulator can demodulate the interpolation signal $Y_f(kTi)$ more accurately.

Since the amplitude of the timing errors in the interpolation signal $Y_f(kTi)$ input to the demodulator by the timing recovery circuit 10 has a close relation with the accuracy of the demodulation process preformed by the demodulator on the interpolation signal $Y_f(kTi)$, i.e. a small interpolation signal $Y_f(kTi)$ corresponding to an accurate demodulation process performed by the demodulator on the interpolation signal $Y_f(kTi)$, designers to design the timing recovery circuit 10 have made a great effort and try to design a timing recovery circuit, on a basis of a variety of Mathematics and Physics methods, good enough to calculate the timing_offset signal μ more accurately, and to reduce the timing errors in the interpolation signal $Y_f(kTi)$ as small as possible.

SUMMARY OF INVENTION

It is therefore a primary objective of the claimed invention to provide a Newton's method-based timing recovery circuit capable of reducing the timing errors in the interpolation signal $Y_f(kTi)$ as small as possible.

According to the claimed invention, the Newton's method-based timing recovery circuit includes: a sampling clock generator for generating a sampling clock; a sampler for sampling a wireless signal input to the timing recovery circuit according to the sampling clock, and for generating a sampling signal; an interpolator for interpolating the sampling signal according to a current timing_offset signal, and for generating an interpolation signal; a timing error detector for detecting timing errors in the interpolation signal, and for generating a current timing error signal, which is a function of the current timing_offset signal; a differentiator for generating a differentiated current timing error signal, which is a differential function of the current timing_offset signal; a first divider for dividing the current timing error signal by the differentiated current timing error signal; a first subtractor for subtracting the current timing error signal dividing the differentiated current timing error signal generated from the first divider from the current timing_offset signal, and for generating a succeeding timing_offset signal, which is right next to the current timing_offset signal; a first delayer for feeding the succeeding timing_offset signal generated from the first subtractor back to the first subtractor after one period of the sampling clock; and a second delayer for transferring the succeeding timing_offset signal transferred from the first delayer to the first subtractor to the differentiator after one period of the sampling clock.

According to the claimed invention, the present invention further discloses another Newton's method-based timing recovery circuit. In addition to the sampling clock generator, the sampler, the interpolator, the timing error detector, the first delayer, the timing recovery circuit further includes a third delayer, a second subtractor, a rightward shifter, a multiplexer, a leftward shifter, a fourth delayer, a second comparator, an incrementing/decrementing device, and a first comparator, which are all installed to replace the differentiator, the first divider, and the subtractor of the timing recovery circuit of the preferred embodiment.

According to the second embodiment, the leftward shifter is capable of leftward shifting the differentiated current timing error signal output from the multiplexer by one or by two bits, and the rightward shifter is capable of rightward shifting ((the current timing error signal output from the timing error detector)—(the preceding timing error signal output from the third delayer)) output from the second subtractor by one or by two bits.

The advantage of the present invention is that the timing recovery circuit can, along with the increasing of the number of the timing error signal output from the incrementing/decrementing device and from the first divider, confine the timing errors in the interpolation signal within a predetermined timing error range, which corresponds to a demodulating capability of a demodulator electrically connected to the timing recovery circuit. Therefore, the demodulator can demodulate the interpolation signal generated by the interpolator of the timing recovery circuit accurately.

Moreover, the timing recovery circuit disclosed in the second embodiment is far smaller in size than the timing recovery circuit disclosed in the preferred embodiment, and the timing recovery circuit disclosed in the second embodiment is far cheaper than the timing recovery circuit disclosed in the preferred embodiment accordingly.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

FIG. 4 lists a plurality of dividers and their corresponding gate counts.

FIG. 5 lists a plurality of comparators and their corresponding gate counts.

DETAILED DESCRIPTION

The timing recovery circuit of the present invention is developed on a basis of the Newton's method. After a finite number of iterating calculations, the timing recovery circuit has the capability to limit the timing errors in the interpolation signal $Y_f(kTi)$ within a predetermined timing error range according to the demodulating capability of a demodulator, the predetermined timing error corresponding to the demodulating capability of the demodulator.

In general, the Newton's method is proposed to solve a polynomial $f(x)$ and to obtain the approximate roots of the polynomial $f(x)$. How the Newton's method solves the polynomial $f(x)$ is described as follows briefly: The Taylor's series of the polynomial $f(x)$, when $x=x_0+\epsilon$, is $$f(x_0 + \varepsilon) = f(x_0) + f'(x_0)*\varepsilon + \frac{1}{2}f''(x_0)*\varepsilon^2 + . \quad \text{(equation 1)}$$

Assume $\epsilon$ is very small and the equation 1 can be simplified as $f(x_0+\epsilon) \approx f(x_0)+f'(x_0)*\epsilon$ (equation 2); Let $f(x_0+\epsilon)=0$ and $\epsilon=\epsilon_0$, the equation 2 can be re-written as $$\varepsilon_0 = -\frac{f(x_0)}{f'(x_0)}, \quad \text{(equation 3)}$$

where $\epsilon_0$ is called a first-order offset of the root's position of the polynomial $f(x)$; Then, let $x_1=x_0+\epsilon_0$ and calculate $\epsilon_1$ right next to $\epsilon_0$, that is, $$\varepsilon_1 = -\frac{f(x_1)}{f'(x_1)};$$

Likewise, an (n+1)th-order offset of the root's position of the polynomial $f(x)$ can be obtained, that is, $$\varepsilon_n = -\frac{f(x_n)}{f'(x_n)}. \quad \text{(equation 4)}$$

Since $\epsilon_n = X_{n+1}-x_n$, the equation 4 can be re-written as $$x_{n+1} = x_n - \frac{f(x_n)}{f'(x_n)}. \quad \text{(equation 5)}$$

Through a proper selection of $x_0$, the Newton's method can, along with the increasing of the iterating calculation number n, obtain an approximate root $x_{n+1}$ of the polynomial $f(x)$, which is close to a real root $x_{real}$ of the polynomial $f(x)$. A difference between the approximate root $x_{real}$ and the real root $x_{real}$ is within $\epsilon_n$, and another difference between $f(x_{n+1})$ and $f(x_{real})$ is smaller than a predetermined range.

Figure 1:
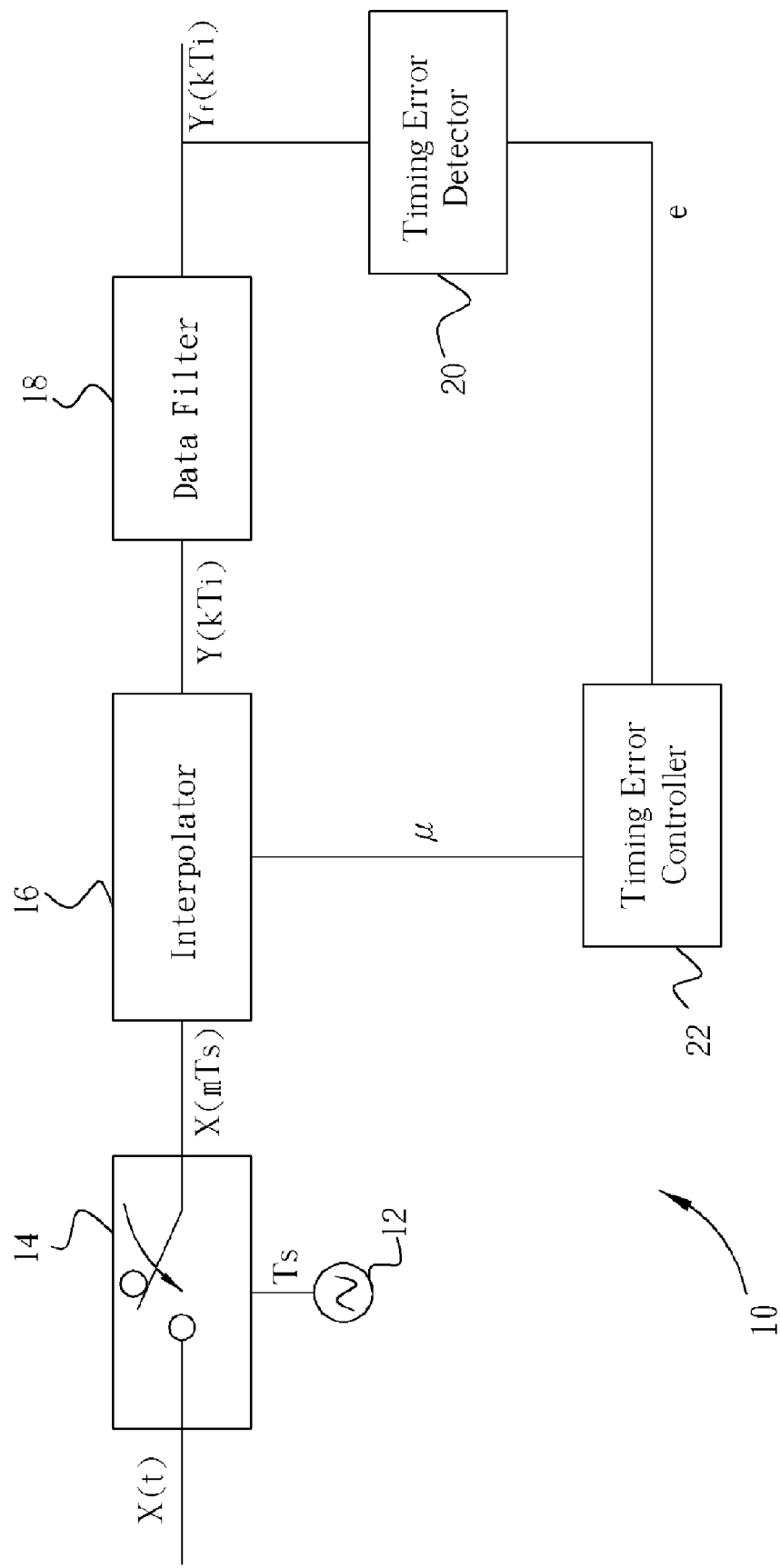
FIG. 1 is a function block diagram of a timing recovery circuit according to the prior art.
Figure 2:
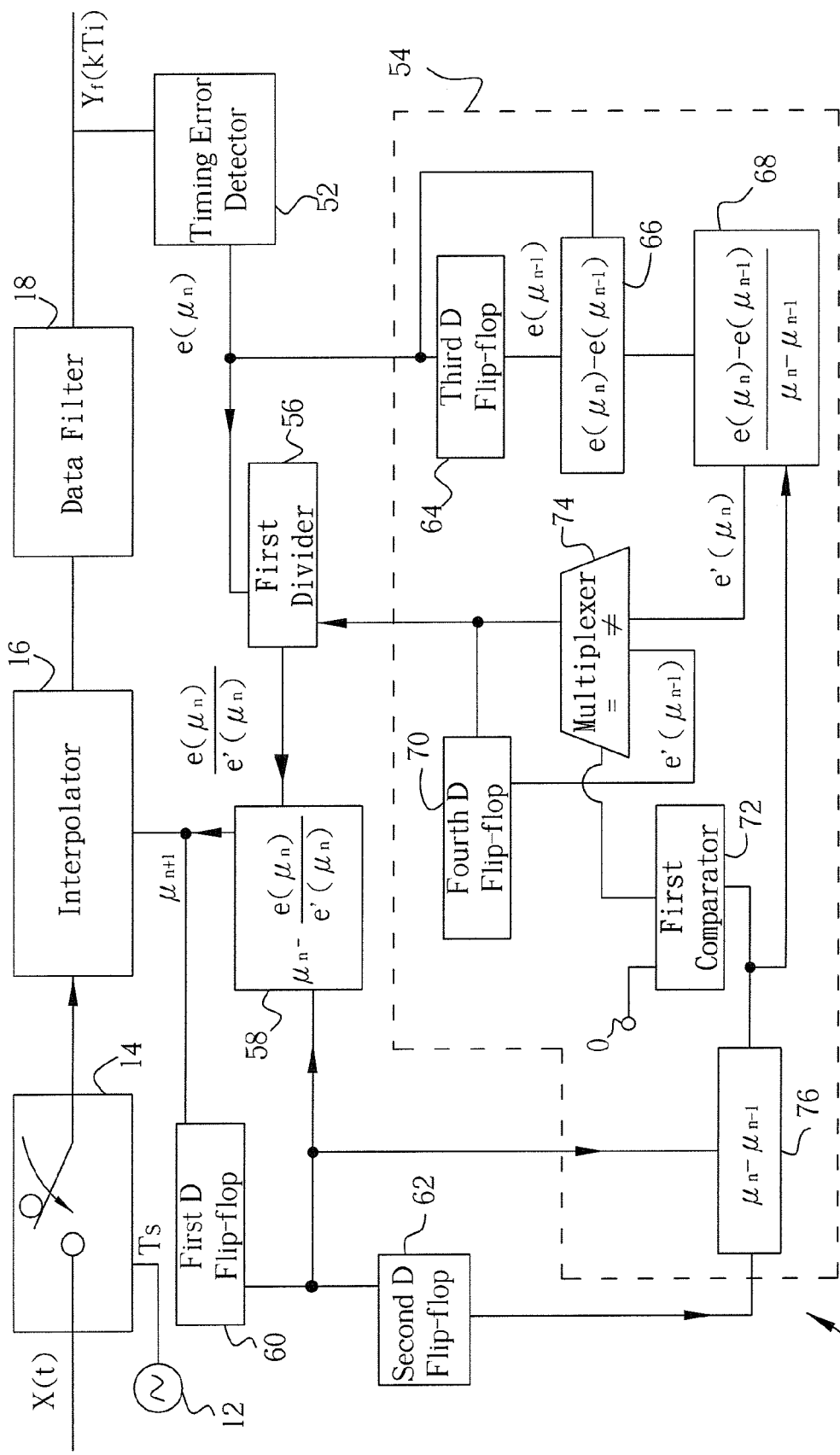
FIG. 2 is a function block diagram of a timing recovery circuit of the preferred embodiment according to the present invention.

Please refer to FIG. 2, which is a function block diagram of a timing recovery circuit 50 developed on the basis of the Newton's method of the preferred embodiment according to the present invention. In addition to the sampling clock generator 12, the sampler 14, the interpolator 16, and the data filter 18, the timing recovery circuit 50 further comprises a timing error detector 52 electrically connected to the data filter 18, a differentiator 54 electrically connected to the timing error detector 52, a first divider 56 electrically connected to the timing error detector 52 and the differentiator 54, a first subtractor 58 electrically connected to the first divider 56 and the interpolator 16, a first D flip-flop 60 electrically connected to the first subtractor 58 and the interpolator 16, a second D flip-flop 62 electrically connected to the first D flip-flop 60, the first subtractor 58, and the differentiator 54. In essence, the first D flip-flop 60, and the second D flip-flop as well, is one kind of delayers.

For the convenience of description, the equation 5—

$$x_{n+1} = x_n - \frac{f(x_n)}{f'(x_n)}$$

is re-written as follows:

$$\mu_{n+1} = \mu_n - \frac{e(\mu_n)}{e'(\mu_n)}. \quad \text{(equation 6)}$$

The timing error detector 52 generates a current timing error signal $e(\mu_n)$ according to a current timing_offset signal $\mu_n$. In practice, the timing error detector 52, in accordance with the current timing_offset signal $\mu_n$, executes a variety of algorithms, such as an Early-Late, a Zero-Crossing, and an M&M algorithms, and generates the current timing error signal $e(\mu_n)$. The differentiator 54 differentiates the current timing error signal $e(\mu_n)$ from the timing error detector 54 and generates a differentiated current timing error signal $e'(\mu_n)$; The first divider 56 divides the current timing error signal $e(\mu_n)$ by the differentiated current timing error signal $e'(\mu_n)$ and outputs a dividing result $$\frac{e(\mu_n)}{e'(\mu_n)}$$

to the first subtractor 58; The first subtractor 58 subtracts the dividing result $$\frac{e(\mu_n)}{e'(\mu_n)}$$

from the current timing_offset signal $\mu_n$ and generates a succeeding timing_offset signal $\mu_{n+1}$, which is generated right next to the current timing_offset signal $\mu_n$; The first D flip-flop

60, after one sampling clock Ts, feeds the succeeding timing_offset signal $\mu_{n+1}$ generated from the first subtractor 58 back to the first subtractor 58. In reverse, before the first subtractor 58 subtracts the dividing result $$\frac{e(\mu_n)}{e'(\mu_n)}$$

from the current timing_offset signal $\mu_n$ and generates the succeeding timing_offset signal $\mu_{n+1}$, the first D flip-flop 60 has already transferred the current timing_offset signal $\mu_n$ to the first subtractor 58; The second D flip-flop 62, after one sampling clock Ts, transfers the succeeding timing_offset signal $\mu_{n+1}$ generated from the first D flip-flop 60 to the differentiator 54. Similarly, the second D flip-flop 62 transfers a preceding timing_offset signal $\mu_{n-1}$ to the differentiator 54 at the time when the first D flip-flop 60 is transferring the current timing_offset signal $\mu_n$ to the first subtractor 58, the current timing_offset signal being generated right next to the preceding timing₁₃ offset signal $\mu_{n-1}$.

According to the preferred embodiment, the differentiator 54 comprises a third D flip-flop 64 electrically connected to the timing error detector 52 and the first subtractor 56, a second subtracotr 66 electrically connected to the third D flip-flop 64, a second divider 68 electrically connected to the second subtractor 66, a third subtractor 76 electrically connected to the first and the second D flip-flops 60 and 62, a first comparator 72 electrically connected to the third subtractor 76, a fourth D flip-flop 70 electrically connected to the first divider 56, and a multiplexer 74 electrically connected to the second divider 68, the first comparator 72, and the fourth D flip-flop 70. The third D flip-flop 64, and the fourth D flip-flop 70 as well, is one kind of delayers.

The operations of the third and the fourth D flip-flops 64 and 70, the second and the third subtractors 66 and 76, and the second divider 68 are the same as those of the first and the second D flip-flops 60 an d 62, the first subtractor 58, an d the first divider 56, further description hereby omitted. A signal $$\frac{e(\mu_n) - e(\mu_{n-1})}{\mu_n - \mu_{n-1}}$$

generated by the second divider 68 is in equivalent equal to the differentiated current timing error signal $e'(\mu_n)$; The first comparator 72 compares the current timing_offset signal $\mu_n$ with the preceding timing_offset signal $\mu_{n-1}$, and determines if a difference between the current timing_offset signal $\mu_n$ and the preceding timing_offset signal $\mu_{n-1}$ equal to "0"; The multiplexer 74 selectively transfers either the differentiated current timing error signal $e'(\mu_n)$ generated from the second divider 68 or a differentiated preceding timing error signal $e'(\mu_{n-1})$ to the first divider 56 according to a comparing result if the difference between current timing_offset signal $\mu_n$ and the preceding timing_offset signal $\mu_{n-1}$ is equal to "0", the differentiated current timing error signal being right next to the differentiated preceding timing error signal $e'(\mu_{n-1})$. For example, if the first comparator 72 compares that the current timing_offset signal $\mu_n$ is equal to the preceding timing_offset signal $\mu_{n-1}$, the multiplexer 74 transfers the differentiated preceding timing error signal $e'(\mu_{n-1})$ to the first divider 56; On the contrary, if the first comparator 72 compares that the current timing_offset signal $\mu_n$ is not equal to the preceding timing_offset signal $\mu_{n-1}$, the multiplexer 74 transfers the differentiated current timing error signal $e'(\mu_n)$ to the first divider 56.

The Newton's method can, along with the increasing of the iterating calculation number n, obtain an approximate root $x_{n+1}$, of the polynomial f(x), a difference between $f(x_{n+1})$ and $f(x_{real})$ being smaller than the predetermined range. Accordingly, the Newton's method-based timing recovery circuit 50 can, after a finite number of iterating calculations, confine the timing error in the interpolation signal $Y_f(kTi)$ within the predetermined timing error range, which corresponds to the demodulating capability of the demodulator. Therefore, the demodulator can demodulate the interpolation signal $Y_f(kTi)$ generated from the interpolator 16 of the timing recovery circuit 50 accurately.

Of the timing recovery circuit 50, the first divider 56 is installed to divide the current timing error signal $e(\mu_n)$ by the differentiated current timing error signal (or by the differentiated preceding timing error signal $e'(\mu_{n-1})$, depending on whether the comparing result performed by the first comparator 72 to compare the current timing_offset signal $\mu_n$ with the preceding timing_offset signal $\mu_{n-1}$), and to transfer a dividing result $$\frac{e(\mu_n)}{e'(\mu_n)} \left( \text{or } \frac{e(\mu_n)}{e'(\mu_{n-1})} \right)$$

to the first subtractor 58. The second divider 68 is installed to divide $(e(\mu_n)-e(\mu_{n-1}))$ generated from the second subtractor 66 by $(\mu_n-\mu_{n-1})$ generated from the third subtractor 76, and to generate another dividing result $$\frac{e(\mu_n) - e(\mu_{n-1})}{\mu_n - \mu_{n-1}},$$

i.e. the differentiated current timing error signal $e'(\mu_n)$. Since a first digital number, such as the differentiated current timing error signal $e'(\mu_n)$, multiplied by $2^n$ is in equivalent, in a digital number operation, to the first digital number shifted leftward by n bits. On the other hand, a second digital number divided by $2^n$ is in equivalent equal to the second digital number shifted rightward by n bits. The timing recovery circuit 50 can be simplified in accordance with the characteristic of the digital number.

Figure 3:
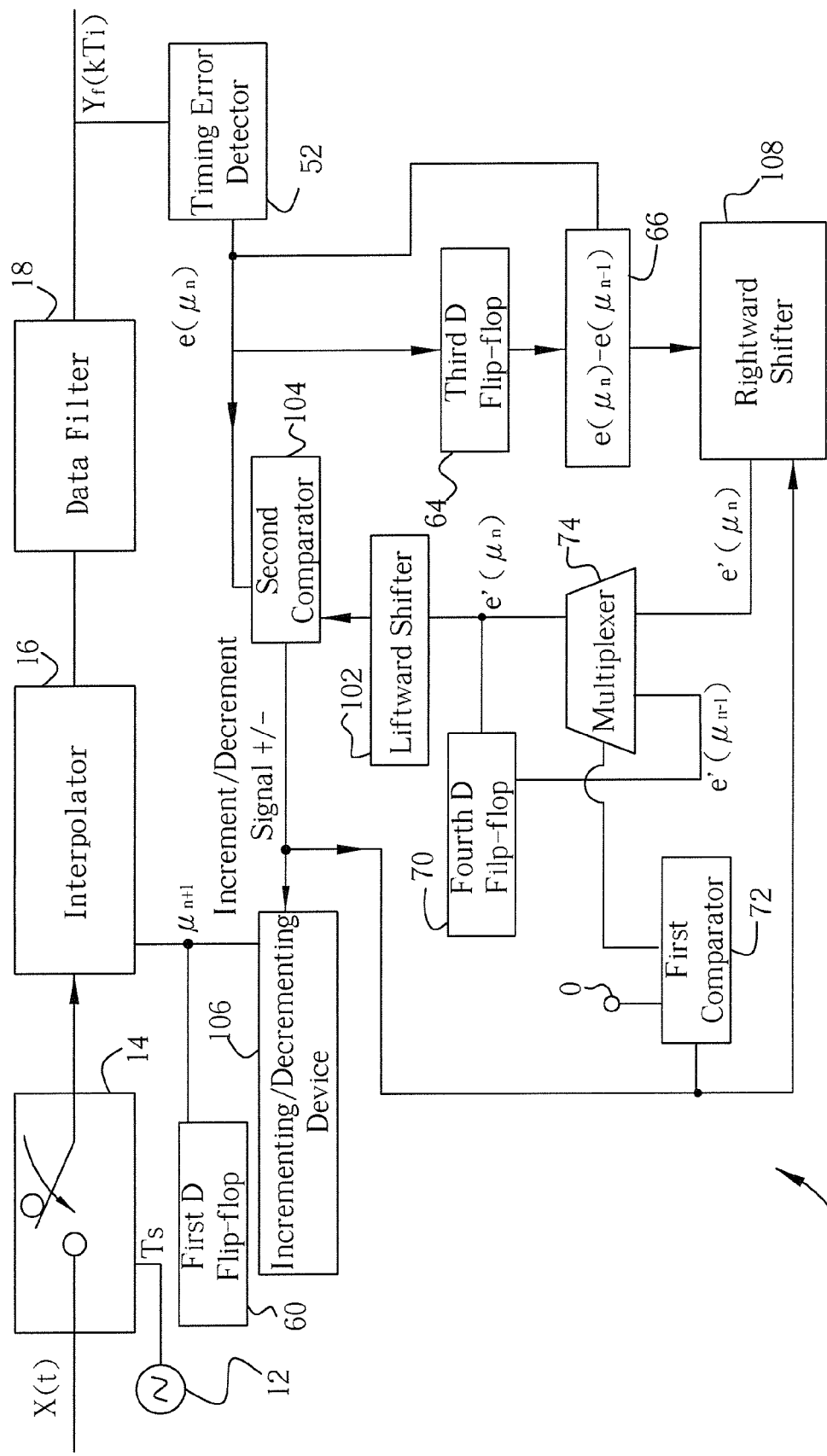
FIG. 3 is a function block diagram of a timing recovery circuit of a second embodiment according to the present invention.

Please refer to FIG. 3, which is a function block diagram of a timing recovery circuit 100 of a second embodiment according to the present invention. In addition to the sampling clock generator 12, the sampler 14, the interpolator 16, the data filter 18, the timing error detector 52, the first D flip-flop 60, the third D flip-flop 64, the second divider 66, the fourth D flip-flop 70, the first comparator 72, and the multiplexer 74, the timing recovery circuit 100 further comprises a leftward shifter 102 electrically connected to the multiplexer 74, a second comparator 104 electrically connected to the leftward shifter 102 and the timing error detector 52, an incrementing/decrementing device 106 electrically connected to the first D flip-flop 60, the second comparator 104, and the interpolator 16, and a rightward shifter 108 electrically connected to the second subtractor 66 and the multiplexer 74.

The leftward shifter 102 is installed to leftward shift the differentiated timing error signal $e'(\mu_n)$ by one and by two bits, and to generate a twofold differentiated current timing error signal $e'(\mu_n)_{x2}$ and a fourfold differentiated current timing error signal e'($\mu_n$)$_{x4}$, the twofold differentiated current timing signal e'($\mu_n$)$_{x2}$ being two times as large as the differentiated current timing signal, and the fourfold differentiated current timing error signal e'($\mu_n$)$_{x4}$ being four times as large as the differentiated current timing error signal e'($\mu_n$). In addition, the leftward shifter 102 further multiplies the differentiated current timing error signal e'($\mu_n$), the twofold differentiated current timing error signal e'($\mu_n$)$_{x2}$, and the fourfold differentiated current timing error signal e'($\mu_n$)$_{x4}$ with minus one (−1), and generates a minus differentiated current timing error signal e'($\mu_n$)$_{-1}$, a minus twofold differentiated current timing error signal e'($\mu_n$)$_{-x2}$, and a minus fourfold differentiated current timing error signal e'($\mu_n$)$_{-x4}$; The second comparator 104 is installed to compare the timing error signals, such as the twofold differentiated current timing error signal e'($\mu_n$)$_{x2}$ and the fourfold differentiated current timing error signal e'($\mu_n$)$_{x4}$, generated from the leftward shifter 102 with the current timing error signal e($\mu_n$) and to generate an increment/decrement signal +/−; The incrementing/decrementing device 106 is installed to increment/decrement the current timing_offset signal $\mu_n$ according to the increment/decrement signal +/− generated from the second comparator 104, and to generate the succeeding timing_offset signal $\mu_{n+1}$; The first comparator 72 compares if the increment/decrement signal +/− is a non-changed signal "0". The incrementing/decrementing device 106, after receiving the non-changed signal "0", will not change the current timing$_{13}$ offset signal u$_n$. That is to say, the succeeding timing_offset signal $\mu_{n+1}$ that the incrementing/decrementing device 106 generates when receiving the non-changed signal "0" is equal to the current timing_offset signal $\mu_n$; The rightward shifter 108 is installed to rightward shift the (e($\mu_n$)-e($\mu_{n-1}$)) generated from the second subtractor 66 by zero, by one, and by two bits according to the increment/decrement signal +/−, and to generate the differentiated current timing error signal e'($\mu_n$); The multiplexer 74 selectively transfers the differentiated current timing error signal e'($\mu_n$) generated from the rightward shifter 108 or the differentiated preceding timing error signal e($\mu_{n-1}$) generated from the fourth D flip-flop 70 to the leftward shifter 102 according to the comparing result by the first comparator 72 to compare the increment/decrement signal +/− and the non-changed signal "0". For example, if the first comparator 72 compares that the increment/decrement signal +/− is the same as the non-changed signal "0", the multiplexer 74 transfers the differentiated preceding timing error signal e'($\mu_{n-1}$) to the leftward shifter 102; On the contrary, if the first comparator 72 compares that the increment/decrement signal +/− is not equal to the non-changed signal "0", the multiplexer 74 transfers the differentiated current timing error signal e'($\mu_n$) to the leftward shifter 102.

The operation of the timing recovery circuit 100 is described as follows:

(1) After comparing that the current timing error signal e($\mu_n$) is still larger than the fourfold differentiated current timing error signal e'($\mu_n$)$_{x4}$, the second comparator 104 generates a fourfold incrementing signal "+4". Upon receiving the fourfold incrementing signal "+4", the incrementing/decrementing device 106 reduces the current timing_offset signal $\mu_n$ by four chip-times T$_{chip}$ and generates the succeeding timing_offset signal $\mu_{n+1}$, which is equal to (the current timing_offset signal $\mu_n$—four chip-times T$_{chip}$), and the rightward shifter 108 rightward shifts the (e($\mu_{n+1}$)-e($\mu_n$)) ready to be generated from the second subtractor 66 by two bits and generates a differentiated timing error signal e'($\mu_{n+1}$), wherein the succeeding timing error signal e($\mu_{n+1}$) being generated from the timing error detector 52 according to the succeeding timing_offset signal $\mu_{n+1}$, and the differentiated succeeding timing error signal e'($\mu_{n+1}$) being right next to the differentiated current timing error signal e'($\mu_n$). Moreover, since the first comparator 72 compares that the increment/decrement signal +/− (the fourfold incrementing signal "+4") is not the non-changed signal "0", the multiplexer 74 therefore transfers the differentiated succeeding timing error signal e'($\mu_{n+1}$) generated from the rightward shifter 108 to the leftward shifter 102;

(2) After comparing that the current timing error signal e($\mu_n$) is smaller than the fourfold differentiated current timing error signal e'($\mu_n$)$_{x4}$ but larger than the twofold differentiated current timing error signal e'($\mu_n$)$_{x2}$, the second comparator 104 generates a twofold incrementing signal "+2". Upon receiving the twofold incrementing signal "+2", the incrementing/decrementing device 106 reduces the current timing_offset signal $\mu_n$ by two chip-times T$_{chip}$ and generates the succeeding timing_offset signal $\mu_{n+1}$, which is equal to (current timing_offset signal $\mu_n$—two chip-times T$_{chip}$), and the rightward shifter 108 rightward shifts (e($\mu_{n+1}$)-e($\mu_n$)) generated from the second subtractor 66 by one bit and generates the differentiated succeeding timing error signal e'($\mu_{n+1}$). Moreover, since the first comparator 72 compares that the increment/decrement signal +/− (the twofold incrementing signal "+2") is not the non-changed signal "0", the multiplexer 74 therefore transfers the differentiated succeeding timing error signal e'($\mu_{n+1}$) generated from the rightward shifter 108 to the leftward shifter 102;

(3) After comparing that the current timing error signal e($\mu_n$) is smaller than the twofold differentiated current timing error signal e'($\mu_n$)$_{x2}$ but larger than the differentiated current timing error signal e'($\mu_n$) the second comparator 104 generates a onefold incrementing signal "+1". Upon receiving the onefold incremwnting signal "+1", the incrementing/decrementing device 106 reduces the current timing_offset signal $\mu_n$ by one chip-time T$_{chip}$ and generates the succeeding timing_offset signal u$_{n+1}$, which is equal to (current timing_offset signal u$_n$—one chip-time T$_{chip}$), and the rightward shifter 108 rightward shifts (e($\mu_{n+1}$)-e($\mu_n$)) generated from the second subtractor 66 by zero bit (that is, no bit-shifting operation is performed) and generates the differentiated succeeding timing error signal e'($\mu_{n+1}$). Moreover, since the first comparator 72 compares that the increment/decrement signal +/− (equal to the onefold incrementing signal "+1") is not the non-changed signal "0", the multiplexer 74 therefore transfers the differentiated succeeding timing error signal e'($\mu_{n+1}$) generated from the rightward shifter 108 to the leftward shifter 102;

(4) After comparing that the current timing error signal e($\mu_n$) is smaller than the differentiated current timing error signal e'($\mu_n$) but larger than the minus differentiated current timing error signal e'($\mu_n$)$_{-1}$, the second comparator 104 generates the non-changed signal "0". Upon receiving the non-changed signal "0", the incrementing/decrementing device 106 neither increments nor decrements the current timing_offset signal $\mu_n$ and generates the succeeding timing_offset signal $\mu_{n+1}$, which is equal to the current timing_offset signal $\mu_n$, and the rightward shifter 108 does not perform any bit-shifting operation on (e($\mu_{n+1}$)-e($\mu_n$)) generated from the second subtractor 66, (for the differentiated succeeding timing error signal e'($\mu_{n+1}$) generated from the rightward shifter 108 upon receiving the non-changed signal "0" will not transferred by the multiplexer 74 to the leftward shifter 102, and the rightward shifter 108 does not have to take any effort on the bit-shifting operation of (e($\mu_{n+1}$)-e($\mu_n$)) and generates the differentiated succeeding timing error signal e'($\mu_{n+1}$). Moreover, since the first comparator 72 compares that the increment/decrement signal +/− (equal to the non-changed signal "0") is indeed the non-changed signal "0", the multiplexer 74 therefore transfers the differentiated current timing error signal e'($\mu_n$) generated from the fourth D flip-flop 70 to the leftward shifter 102;

(5) After comparing that the current timing error signal e($\mu_n$) is smaller than the differentiated current timing error signal e'($\mu_n$)$_{-1}$ but larger than the minus twofold differentiated current timing error signal e'($\mu_n$)$_{-x2}$, the second comparator 104 generates a onefold decrementing signal "−1". Upon receiving the onefold decrementing signal "−1", the incrementing/decrementing device 106 increases the current timing_offset signal $\mu_n$ by one chip-time $T_{chip}$ and generates the succeeding timing_offset signal $\mu_{n+1}$, which is equal to (current timing_offset signal $\mu_n$+one chip-time $T_{chip}$), and the rightward shifter 108 rightward shifts (e($\mu_{n+1}$)-e($\mu_n$)) generated from the second subtractor 66 by zero bit (that is, no bit-shifting operation is performed) and generates the differentiated succeeding timing error signal e'($\mu_{n+1}$). Moreover, since the first comparator 72 compares that the increment/decrement signal +/− (equal to the onefold decrementing signal "−1") is not the non-changed signal "0", the multiplexer 74 transfers the differentiated succeeding timing error signal e'($\mu_{n+1}$) generated from the rightward shifter 108 to the leftward shifter 102;

(6) After comparing that the current timing error signal e($\mu_n$) is smaller than the twofold differentiated current timing error signal e'($\mu_n$)$_{-x2}$ but larger than the minus fourfold differentiated current timing error signal e'($\mu_n$)$_{-x4}$, the second comparator 104 generates a twofold decrementing signal "−2". Upon receiving the twofold decrementing signal "−2", the incrementing/decrementing device 106 increases the current timing_offset signal $\mu_n$ by two chip-times $T_{chip}$ and generates the succeeding timing_offset signal $\mu_{n+1}$, which is equal to (current timing_offset signal $\mu_n$+two chip-times $T_{chip}$), and the rightward shifter 108 rightward (e($\mu_{n+1}$)-e($\mu_n$)) generated from the second subtractor 66 by one bit and generates the differentiated succeeding timing error signal e'($\mu_{n+1}$). Moreover, since the first comparator 72 compares the increment/decrement signal +/− (equal to the twofold decrementing signal "−2") is not the non-changed signal "0", the multiplexer 74 therefore transfers the differentiated succeeding timing error signal e'($\mu_{n+1}$) generated from the rightward shifter 108 to the leftward shifter 102; and (7) After comparing that the current timing error signal e($\mu_n$) is smaller than the fourfold differentiated current timing error signal e'($\mu_n$)$_{-x4}$, the second comparator 104 generates a fourfold decrementing signal "−4". Upon receiving the fourfold decrementing signal "−4", the incrementing/decrementing device 106 increases the current timing_offset signal $\mu_n$ by four chip-times $T_{chip}$ and generates the succeeding timing_offset signal $\mu_{n+1}$, which is equal to (current timing_offset signal $\mu_n$+four chip-times $T_{chip}$), an d the rightward shifter 108 rightward shifts (e($\mu_{n+1}$)-e($\mu_n$) generated from the second subtractor 66 by two bits and generates the differentiated succeeding timing error signal e'($\mu_{n+1}$). Moreover, since the first comparator 72 compares that the increment/decrement signal +/− (equal to the fourfold decrementing signal "−4") is not the non-changed signal "0", the multiplexer 74 therefore transfers the differentiated succeeding timing error signal e'($\mu_{n+1}$) generated from the rightward shifter 108 to the leftward shifter 102.

Since the leftward shifter 102, and the rightward shifter 108 as well, can be realized by guiding the signals input to them, such as the differentiated current timing error signal e'($\mu_n$) and (e($\mu_{n+1}$)-e($\mu_n$)), to flow to a plurality of multiplexers controlled by the increment/decrement signal +/−, besides the sampling clock generator 12, the sampler 14, the interpolator 16, and the data filter 18, what the timing recovery circuit 100 comprises are multiplexers and comparators, both of which occupy too small an area. However, besides the sampling clock generator 12, the sampler 14, the interpolator 16, and data filter 18, what the timing recovery circuit 50 comprises are dividers, i.e. the first and the second dividers 56 and 68, both of which occupy too large an area. Please refer to FIG. 4 and FIG. 5. FIG. 4 lists a plurality of dividers and their corresponding gate counts. FIG. 5 lists a plurality of comparators and their corresponding gate counts. It can be apparently seen in the FIG. 4 and FIG. 5 that a divider designed to divide a 16-bit n umber by an 8-bit number has to occupy an area (1866.7) more than 15 times as large as that (121) occupied by a comparator designed to compare two 16-bit numbers. In conclusion, the timing recovery circuit 100, which comprises nothing but some small shifters and comparators, is far smaller than the timing recovery circuit 50, which comprises large dividers.

According to the second embodiment, the leftward shifter 102 leftward shifts the differentiated current timing error signal e'($\mu_n$) by one and by two bits, and generates corresponding timing error signals. Of course, a leftward shifter of a timing recovery circuit of the present invention can leftward shift the differentiated current timing error signal e'($\mu_n$) by any number of bits, and generate corresponding timing error signals. It is noted that bit shifting operation performed by rightward shifters of the timing recovery circuit has to comply with that of the leftward shifters.

Moreover, since the second divider 68 of the timing recovery circuit 50 divides (e($\mu_n$)-e($\mu_{n-1}$)) generated from the second subtractor 66 by two or by four at most, depending on ($\mu_n$-$\mu_{n-1}$) generated from the third subtractor 76, and the second divider 68 is small accordingly, the rightward shifter 108 of the timing recovery circuit 100 can be replaced by the second divider 68, which is capable of dividing (e($\mu_n$)-e($\mu_{n-1}$)) generated from the second subtractor 66 by the increment/decrement signal +/− output from the second comparator 104.

In contrast to prior art, the present invention can provide a Newton's method-based timing recovery circuit. Through the application of the characteristic of the Newton's method to solve a polynomial accurately, the timing recovery circuit can generate an interpolation signal, whose timing errors are confined within a predetermined timing error range, which corresponds to a demodulating capability of a demodulator. Therefore, the demodulator can demodulate the interpolation signal accurately. According to the preferred embodiment, the timing recovery circuit 50 is designed to comprise dividers, which occupy too large an area. However, the timing recovery circuit 100 of the second embodiment comprises nothing but a plurality of shifters and comparators, both of which occupy too small an area. Accordingly, the timing recovery circuit 100 is small and cheap than the timing recovery circuit 50.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A Newton's method-based timing recovery circuit comprising:

a sampling clock generator for generating a sampling clock;

a sampler for sampling a wireless signal input to the timing recovery circuit according to the sampling clock, and for generating a sampling signal;

an interpolator for interpolating the sampling signal according to a current timing_offset signal, and for generating an interpolation signal;

a timing error detector for detecting timing errors in the interpolation signal, and for generating a current timing error signal, which is a function of the current timing_offset signal;

a differentiator for generating a differentiated current timing error signal, which is a differential function of the current timing_offset signal;

a first divider for dividing the current timing error signal by the differentiated current timing error signal;

a first subtractor for subtracting the current timing error signal divided by the differentiated current timing error signal generated from the first divider from the current timing_offset signal, and for generating a succeeding timing_offset signal, which is right next to the current timing_offset signal;

a first delayer for feeding the succeeding timing_offset signal generated from the first subtractor back to the first subtractor after one period of the sampling clock;

a second delayer for transferring the succeeding timing_offset signal transferred from the first delayer to the first subtractor to the differentiator after one period of the sampling clock; and an output for outputting the interpolation signal generated by the interpolator according to the current timing_offset signal.

2. The timing recovery circuit of claim 1, wherein the differentiator comprises:

a third delayer for transferring a preceding timing error signal generated from the timing error detector to the first divider after one period of the sampling clock, the current timing error being right next to the preceding timing error signal;

a second subtractor for subtracting the preceding timing error signal generated by the third delayer from the current timing error signal generated by the timing error detector;

a third subtractor for subtracting a preceding timing_offset signal generated by the second delayer from the current timing_offset signal generated by the first delayer;

a second divider for dividing (the current timing error signal—the preceding timing error signal) generated by the second subtractor by (the current timing_offset signal—the preceding timing_offset signal) generated by the third subtractor;

a first comparator for comparing a predetermined value with (the current timing_offset signal—the preceding timing_offset signal);

a fourth delayer for outputting the differentiated current timing error signal after one period of the sampling clock; and a multiplexer for selectively transferring either ((the current timing error signal—the preceding timing error signal)/(the current timing_offset signal—the preceding timing_offset signal) generated by the second divider or the differentiated current timing error signal output from the fourth delayer to the first divider.

3. The timing recovery circuit of claim 2, wherein the third delayer is a D flip-flop.

4. The timing recovery circuit of claim 2, wherein the fourth delayer is a D flip-flop.

5. The timing recovery circuit of claim 1, wherein the first delayer is a D flip-flop.

6. The timing recovery circuit of claim 1, wherein the second delayer is a D flip-flop.

7. A Newton's method-based timing recovery circuit comprising:

a sampling clock generator for generating a sampling clock;

a sampler for sampling a wireless signal input to the timing recovery circuit according to the sampling clock, and for generating a sampling signal;

an interpolator for interpolating the sampling signal according to a current timing_offset signal, and for generating an interpolation signal;

a timing error detector for detecting timing errors in the interpolation signal, and for generating a current timing error signal, which is a function of the current timing_offset signal;

a third delayer for outputting a preceding timing error signal generated by the timing error detector after one period of the sampling clock, the current timing error signal being right next to the preceding timing error signal;

a second subtractor for subtracting the preceding timing error signal generated by the third delayer from the current timing error signal generated by the timing error detector;

a rightward shifter for rightward shifting ((the current timing error signal generated by the timing error detector)—(the preceding timing error signal output from the third delayer)) generated by the second subtractor according to an increment/decrement signal, and for generating a differentiated current timing error signal;

a multiplexer comprising a first input end for receiving the differentiated current timing error signal output from the rightward shifter;

a leftward shifter for leftward shifting the differentiated current timing error signal output from the multiplexer;

a fourth delayer for feeding the differentiated current timing error signal output from the multiplexer back to a second input end of the multiplexer after one period of the sampling clock;

a second comparator for comparing the current timing error signal output from the timing error detector with the leftward shifted differentiated current timing error signal output from the leftward shifter, and for generating the increment/decrement signal;

an incrementing/decrementing device for changing the current timing_offset signal according to the increment/decrement signal, and for generating a succeeding timing_offset signal, which is right next to the current timing_offset signal;

a first delayer for feeding the succeeding timing_offset signal output from the incrementing/decrementing device back to the incrementing/decrementing device after one period of the sampling clock;

a first comparator for comparing a predetermined signal with the increment/decrement signal, and for controlling the multiplexer to select the differentiated current timing error signal output either from the fourth delayer or from the rightward shifter to the leftward shifter; and an output for outputting the interpolation signal generated by the interpolator according to the current timing_offset signal.

8. The timing recovery circuit of claim 7, wherein the first delayer is a D flip-flop.

9. The timing recovery circuit of claim 7, wherein the third delayer is a D flip-flop.

10. The timing recovery circuit of claim 7, wherein the fourth delayer is a D flip-flop.

11. The timing recovery circuit of claim 7, wherein the incrementing/decrementing device does not change the current timing_offset signal when the second comparator compares that a difference between the current timing error signal output from the timing error detector and the differentiated current timing error signal is within a predetermined range.

12. The timing recovery circuit of claim 11, wherein when the second comparator compares that the difference between the current timing error signal output from the timing error detector and the differentiated current timing error signal is within the predetermined range, the predetermined signal is equal to the increment/decrement signal generated by the incrementing/decrementing device.

13. The timing recovery circuit of claim 7, wherein the first comparator controls the multiplexer to transfer the differentiated current error signal output from the fourth delayer to the leftward shifter when comparing that the increment/decrement signal output from the second comparator being equal to the predetermined signal.

14. The timing recovery circuit of claim 7, wherein the leftward shifter is capable of leftward shifting the differentiated current timing error signal output from the multiplexer by one bit, and the rightward shifter is capable of rightward shifting ((the current timing error signal output from the timing error detector)—(the preceding timing error signal output from the third delayer)) output from the second subtractor by one bit.

15. The timing recovery circuit of claim 14, wherein when the second comparator compares that the current timing error signal output from the timing error detector is larger than a leftward-shifted signal, which is equal to the differentiated current timing error signal leftward-shifted by one bit, the incrementing/decrementing device generates a succeeding timing_offset signal, which is smaller than the current timing_offset signal by one.

16. The timing recovery circuit of claim 14, wherein when the second comparator compares that the current timing error signal output from the timing error detector is larger than a leftward-shifted signal, which is equal to the differentiated current timing error signal leftward-shifted by one bit, the rightward shifter rightward shifts ((the current timing error signal output from the timing error detector)—(the preceding timing error signal output from the third delayer)) output from the second subtractor by one bit.

17. The timing recovery circuit of claim 14, wherein when the second comparator compares that the current timing error signal output from the timing error detector is smaller than a leftward-shifted signal, which is equal to ((−1)* the differentiated current timing error signal leftward-shifted by one bit), the incrementing/decrementing device generates a succeeding timing_offset signal, which is larger than the current timing_offset signal by one.

18. The timing recovery circuit of claim 14, wherein when the second comparator compares that the current timing error signal output from the timing error detector is larger than a leftward-shifted signal, which is equal to ((−1)* the differentiated current timing error signal leftward-shifted by one bit), the rightward shifter rightward shifts ((the current timing error signal output from the timing error detector)—(the preceding timing error signal output from the third delayer)) output from the second subtractor by one bit.

19. The timing recovery circuit of claim 14, wherein the leftward shifter is further capable of leftward shifting the differentiated current timing error signal output from the multiplexer by two bits, and the rightward shifter is further capable of rightward shifting ((the current timing error signal output from the timing error detector)—(the preceding timing error signal output from the third delayer)) by two bits.

20. The timing recovery circuit of claim 19, wherein when the second comparator compares that the current timing error signal output from the timing error detector is larger than a leftward-shifted signal, which is equal to the differentiated current timing error signal leftward-shifted by two bits, the incrementing/decrementing device generates a succeeding timing_offset signal, which is smaller than the current timing_offset signal by two.

21. The timing recovery circuit of claim 19, wherein when the second comparator compares that the current timing error signal output from the timing error detector is larger than a leftward-shifted signal, which is equal to the differentiated current timing error signal leftward-shifted by two bit, the rightward shifter rightward shifts ((the current timing error signal output from the timing error detector)—(the preceding timing error signal output from the third delayer)) output from the second subtractor by two bits.

22. The timing recovery circuit of claim 19, wherein when the second comparator compares that the current timing error signal output from the timing error detector is smaller than a leftward-shifted signal, which is equal to ((−1)* the differentiated current timing error signal leftward-shifted by two bits), the incrementing/decrementing device generates a succeeding timing_offset signal, which is larger than the current timing_offset signal by two.

23. The timing recovery circuit of claim 19, wherein when the second comparator compares that the current timing error signal output from the timing error detector is smaller than a leftward-shifted signal, which is equal to ((−1)* the differentiated current timing error signal leftward-shifted by two bits), the rightward shifter rightward shifts ((the current timing error signal output from the timing error detector)—(the preceding timing error signal output from the third delayer)) output from the second subtractor by two bits.

24. A Newton's method-based timing recovery circuit comprising:
  a sampling clock generator for generating a sampling clock;
  a sampler for sampling a wireless signal input to the timing recovery circuit according to the sampling clock, and for generating a sampling signal;
  an interpolator for interpolating the sampling signal according to a current timing_offset signal, and for generating an interpolation signal;
  a timing error detector for detecting timing errors in the interpolation signal, and for generating a current timing error signal, which is a function of the current timing_offset signal;
  a third delayer for outputting a preceding timing error signal generated by the timing error detector after one period of the sampling clock, the current timing error signal being right next to the preceding timing error signal;
  a second subtractor for subtracting the preceding timing error signal generated by the third delayer from the current timing error signal generated by the timing error detector;

a second divider for dividing (the current timing error signal—the preceding timing error signal) generated by the second subtractor by an increment/decrement signal, and for generating a differentiated current timing error signal;

a multiplexer comprising a first input end for receiving the differentiated current timing error signal output from the second divider;

a leftward shifter for leftward shifting the differentiated current timing error signal output from the multiplexer;

a fourth delayer for feeding the differentiated current timing error signal output from the multiplexer back to a second input end of the multiplexer after one period of the sampling clock;

a second comparator for comparing the current timing error signal output from the timing error detector with the leftward shifted differentiated current timing error signal output from the leftward shifter, and for generating the increment/decrement signal;

an incrementing/decrementing device for changing the current timing_offset signal according to the increment/decrement signal, and for generating a succeeding timing_offset signal, which is right next to the current timing_offset signal;

a first delayer for feeding the succeeding timing_offset signal output from the incrementing/decrementing device back to the incrementing/decrementing device after one period of the sampling clock;

a first comparator for comparing a predetermined signal with the increment/decrement signal output from the second comparator, and for controlling the multiplexer to select the differentiated current timing error signal output either from the fourth delayer or from the second divider to the leftward shifter; and an output for outputting the interpolation signal generated by the interpolator according to the current timing_offset signal.

25. The timing recovery circuit of claim 24, wherein the first delayer is a D flip-flop.

26. The timing recovery circuit of claim 24, wherein the third delayer is a D flip-flop.

27. The timing recovery circuit of claim 24, wherein the fourth delayer is a D flip-flop.

* * * * *